Oct. 13, 1970 — I. E. MARVIN — 3,533,238
INLET CONTROL SYSTEM
Filed Dec. 23, 1968 — 2 Sheets-Sheet 2

INVENTOR.
IRA E. MARVIN
BY
ATTORNEY

United States Patent Office 3,533,238
Patented Oct. 13, 1970

3,533,238
INLET CONTROL SYSTEM
Ira E. Marvin, Fairfield, Ohio, assignor to General
Electric Company, a corporation of New York
Filed Dec. 23, 1968, Ser. No. 786,077
Int. Cl. F02c 9/14; F02k 3/04; F02b 27/02
U.S. Cl. 60—233           10 Claims

ABSTRACT OF THE DISCLOSURE

An engine air inlet system for supersonic aircraft is disclosed which includes a bypass for matching the system air flow to engine requirements and a bypass control system responsive to the rate of change of engine air flow demand which is designed to preclude shock expulsion from the inlet.

BACKGROUND OF THE INVENTION

Inlet air for air breathing turbo-propulsion engines must be supplied at subsonic velocity, so it is necessary to decelerate the air entering an inlet system during supersonic flight. This deceleration is usually accomplished with a convergent-divergent supersonic diffuser. In almost all cases, operation of such an inlet at supersonic flight speeds will be accompanied by a normal shock wave, i.e., a shock wave perpendicular to the main flow direction, wherein flow immediately upstream of the wave is supersonic and flow immediately downstream thereof is subsonic. If the normal shock wave is at the throat or minimum area of the diffuser, so that all subsonic flow is in the inlet's divergent portion (i.e., the subsonic diffuser portion), the inlet will perform at maximum or optimum air handling capacity, and operation is termed critical. If, on the other hand, the normal shock is located downstream of the inlet throat or is swallowed by the diffuser, it is possible to have super critical operation to such an extent that flow velocities are even higher in the inlet than in the free stream, with a concomitant reduction in inlet pressure recovery. Conversely, in subcritical operation, the normal shock is regurgitated, i.e., the inlet attempts to deliver more air than is required by the engine creating a condition of high inlet drag due to the flow spillage losses behind the normal shock wave standing outside the inlet. To provide a situation where inlet supply equals engine demand (i.e., where critical operation can be had) the inlet system is conventionally provided with means to vary the inlet handling capabilities such as by ingesting excess air through the inlet diffuser and bypassing it around the engine through auxiliary exhaust ducts.

In addition to providing for efficient steady state operation over a wide range of flight conditions, an inlet system and its control must accommodate sudden transients in engine air flow, such as may be caused by sudden flight maneuvers or by initiation of engine augmentation, to prevent regurgitation of the aerodynamic shock in the inlet and the resultant loss of thrust. Prior art provision for accommodation of transients has included (1) operating the inlet system so that the shock front is downstream of the critical position, thereby providing stability margin sufficient to accommodate inlet and engine disturbances, (2) biasing the inlet control with a dynamic compensation Mach number signal obtained from the inlet duct ahead of the inlet system by pass valves, and (3) biasing the bypass door control with a dynamic compensation pressure signal obtained at the inlet to the engine. Each of the mentioned techniques has its drawbacks, however. The first mentioned technique requires that the inlet system be operated at a point removed from its optimum efficiency. It is preferred to avoid the second and third mentioned techniques inasmuch as the required pressure probes would be placed ahead of the engine where they are subject to icing and also present an engine hazard in the event of their failure. Additionally, neither of the latter two mentioned methods provide as accurate an indication of engine air flow transients or as fast a reaction to engine disturbances as is desired. Further, the air flow pattern in the inlet system ahead of the engine is subject to considerable distortion as a result of flight maneuvers so that pressure signals taken ahead of the engine will at times be quite inaccurate.

In view of the problems recited above, it is desired therefore to provide an inlet system control which will accommodate engine transients and yet operate closely enough to the critical point to obtain the maximum possible inlet pressure recovery.

OBJECTS OF THE INVENTION

It is an object of this invention to provide a supersonic inlet system with a control whereby the variable geometry of the system will be responsive to sudden changes in engine air flow.

A further object of the present invention is to provide such a control wherein the signals for dynamic compensation are obtained directly from the engine and are proportionally indicative of engine air flow demand and changes therein.

SUMMARY OF THE INVENTION

Briefly stated, the invention is an improvement to an engine air inlet system for supersonic aircraft having a converging-diverging inlet diffuser, the improvement comprising bypass means for varying the air flow to the engine inlet, a control for actuating the bypass means to maintain the normal shock wave in the inlet at its optimum position, and means responsive to the rate of change in engine air flow requirements for biasing the control means such that the bypass will be actuated at a rate which is proportional to the said air requirements rate of change.

DESCRIPTION OF THE DRAWINGS

While the invention is distinctly claimed and particularly pointed out in claims at the end of this specification, it will be better understood by reference to the text below and accompanying drawings in which:

DESCRIPTION OF THE PREFERRED EMBODIMENT

Figure 1:
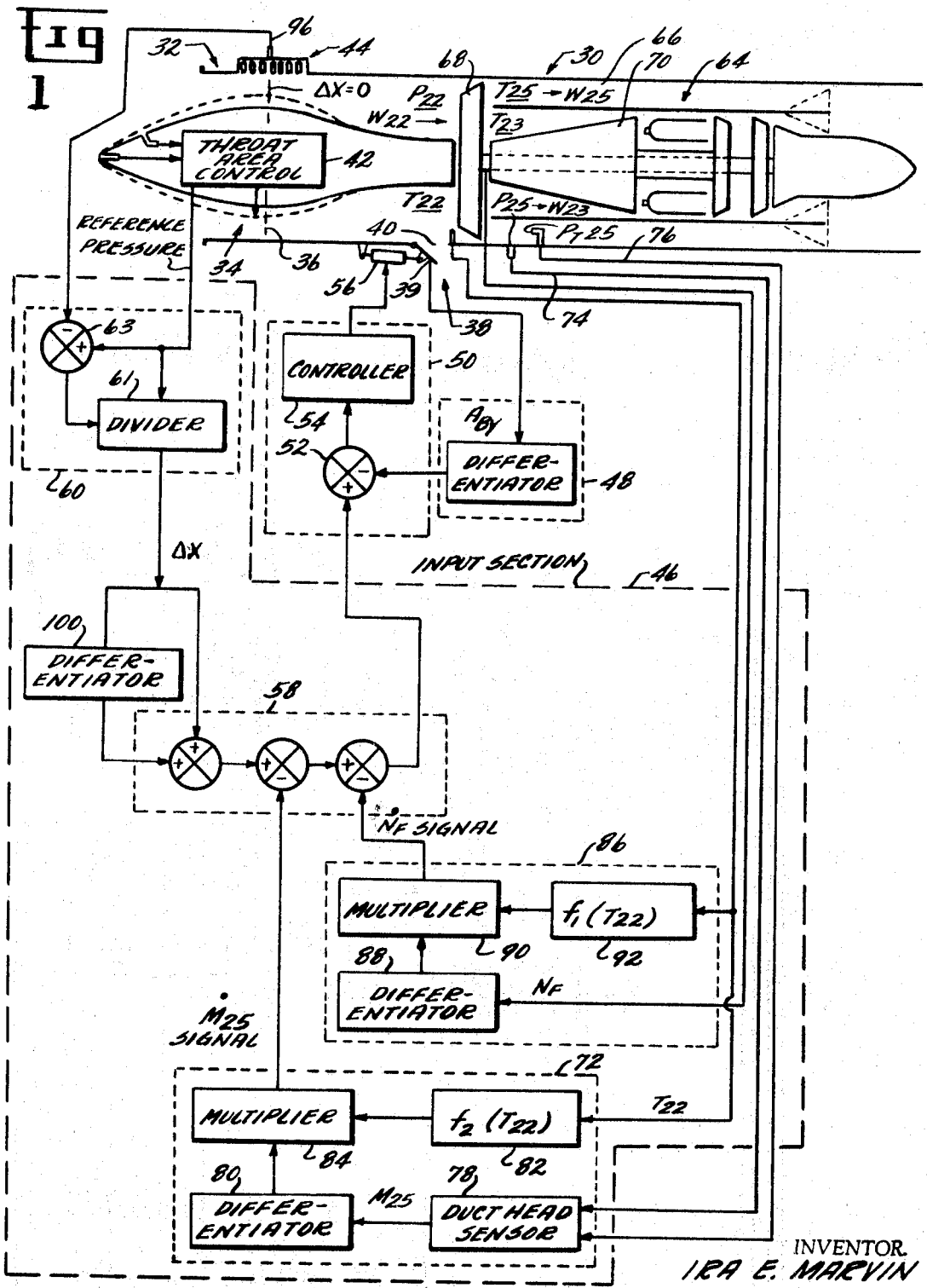
FIG. 1 is a diagrammatic view of an engine inlet and its control system.

FIG. 1 illustrates schematically a typical turbofan engine 30 installed in connection with a supersonic inlet system 32. The inlet system 32 comprises a converging-diverging diffuser 34 whose throat 36 area can be varied in response to flight conditions to optimize pressure recovery, a plurality of bypass means 38 (i.e., doors 39 and openings 40) to pass excess air outside the diffuser system, and a shock position control system which is described below. The inlet system includes a throat area control 42 which automatically maintains inlet area as a function of altitude and flight Mach number and a pressure sensor 44 which is configured such that its output pressure is a function of the position of the normal shock with respect to the throat 36 of the inlet diffuser 34.

The inlet control system comprises generally an input section 46 a feedback section 48 and an error and gain section 50. The input section 46 receives signals proportional to various inlet and engine parameters and manipulates them to form the input for a bypass area rate control loop. The feedback section 48 receives a signal proportional to bypass 38 area, obtains its time rate of change by the use of suitable differentiating means, and passes the time derivative signal to error and gain section 50. In the error and gain section 50, the input and feedback signals are compared by an algebraic summing device 52, and the difference between them provides a signal to a controller 54 which is amplified and converted to a mode suitable for actuation of the bypass door 39 actuator 56. Thus a quick response control loop is provided wherein energization of bypass actuator 56 is proportional to the difference between a bypass 38 area rate of change demand and the actual rate of change of bypass 38 area.

The input section 46 contains several elements which cooperate to generate the demand rate of change of bypass area. The outputs of these elements are added together in the summing device or means 58 (which algebraically adds several signals), schematically illustrated in FIG. 1, to provide the demand signal. Thus a signal from any of the input elements will be transmitted as an input to the error and gain section 50 and be reflected by actuation of the bypass doors 39. The input elements comprise (1) means for generating a signal which is proportional to the rate of change of engine air flow demand, (2) means 60 for generating a signal proportional to the deviation of the normal shock wave from its optimum position, and (3) means 100 for differentiating the shock wave deviation signal with respect to time.

Deriving the rate of change of engine air flow as a function of engine parameters, it can be seen by referring to the engine 30 portion of FIG. 1 that flow continuity requires gas generator 64 air flow (noted as $W_{23}$) plus fan duct 66 air flow (noted as $W_{25}$) to equal the air flow, $W_{22}$, to the fan 68. Duct 66 air flow can be described by the relation $$(1) \qquad \frac{W_{25}\sqrt{T_{25}}}{P_{25}} = f_1\left(\frac{P_{25}-P_{S25}}{P_{S25}}\right)$$

where $T_{25}$ is fan duct total temperature, $P_{25}$ is fan duct total pressure, and $P_{S25}$ is fan duct static pressure. (Throughout this specification, the subscript S used in conjunction with a parametric symbol indicates a static measurement, e.g., static pressure, and the absence of an alphabetic subscript indicates a total measurement, e.g., total pressure or total temperature.) (The left side of Equation 1 is the fan duct 66 Mach number.) The gas generator 64 air flow $W_{23}$ can be expressed by the relation $$(2) \qquad \frac{W_{23}}{P_{25}} = f_2(T_{25}, N_G)$$

where $N_G$ is gas generator 64 speed and $f_2$ depends upon the particular operating characteristic of gas generator 64 compressor 70. Combining Equations 1 and 2 yields total engine airflow, $W_{22}$, in the relation $$(3) \qquad \frac{W_{22}}{P_{25}} = \frac{1}{\sqrt{T_{25}}} f_1\left(\frac{P_{25}-P_{S25}}{P_{S25}}\right) + f_2(T_{25}, N_G)$$

Figure 2:
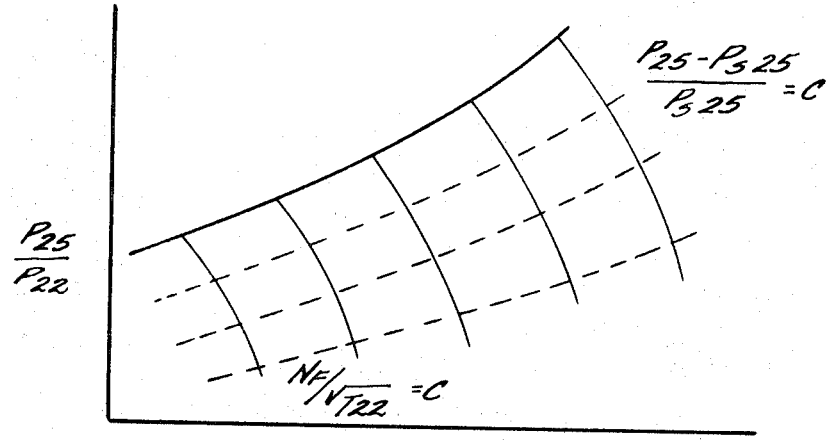
FIG. 2 is a graph showing the operating characteristics of a typical axial flow compressor or fan.

From the fan characteristic map, an example of which is shown in FIG. 2, it is determined that $P_{25}/P_{22}$, the fan 68 pressure ratio, is in the relation $$(4) \qquad \frac{P_{25}}{P_{22}} = f_3\left(\frac{N_F}{\sqrt{T_{22}}}, \frac{W_{22}\sqrt{T_{22}}}{P_{22}}\right)$$

wherein $T_{22}$ is fan 68 inlet temperature, $P_{22}$ is fan 68 inlet pressure, and $N_F$ is fan speed.

Multiplying Equations 3 and 4 yields air flow into the engine 30 in the relation $$(5) \qquad \frac{W_{22}}{P_{22}} = f_3\left(\frac{N_F}{\sqrt{T_{22}}}, \frac{W_{22}\sqrt{T_{22}}}{P_{22}}\right)\left[\frac{1}{\sqrt{T_{25}}} f_1\left(\frac{P_{25}-P_{S25}}{P_{S25}}\right) + f_2(T_{25}, N_G)\right]$$

Computer simulations of turbo fan engines have indicated that for short duration transients, $T_{22}$, $T_{25}$, and $N_G$ are effectively constant. This permits Equation 5 to be simplified to the following functional relationship for dynamic compensation purposes:

$$(6) \qquad \frac{W_{22}}{P_{22}} = f_4\left(N_F, \frac{P_{25}-P_{S25}}{P_{S25}}\right)$$

which for small perturbations can be linearized to $$(7) \qquad \Delta\left(\frac{W_{22}}{P_{22}}\right) = K_1 \Delta N_F + K_2 \Delta\left(\frac{P_{25}-P_{S25}}{P_{S25}}\right)$$

Differentiation of Equation 7 with respect to time yields the rate of change of engine air demand as $$(8) \qquad \left(\frac{\dot{W}_{22}}{P_{22}}\right) = K_1 \dot{N}_F + K_2 \left(\frac{\dot{P}_{25}-\dot{P}_{S25}}{P_{S25}}\right)$$

where $K_1$ and $K_2$ will vary with flight conditions and may be established as functions of $T_{22}$:

$$(9) \qquad K_1 = g_1(T_{22})$$
$$(10) \qquad K_2 = g_2(T_{22})$$

Functions $g_1$ and $g_2$ can be determined from Equation 5 by solving for $W_{22}/P_{22}$ and determining the resulting coefficients of the terms $N_F$ and $$\left(\frac{P_{25}-P_{S25}}{P_{S25}}\right)$$

Inasmuch as changes in $W_{22}/P_{22}$ are proportional to changes in $W_{22}$, Equation 8 thus provides a basis for obtaining a signal proportional to the rate of change of engine air flow demand. It can be similarly shown that for a straight turbojet engine, air flow rate of change for small perturbations can be described by $\dot{W}_{22} = K_3 \dot{N}_G$ where $\dot{N}_G$ is gas generator speed and $K_3$ is a function of inlet temperature $T_{22}$.

Referring again to FIG. 1, the Mach number derivative signal $$K_2\left[\frac{d}{dt}\left(\frac{P_{25}-P_{S25}}{P_{S25}}\right)\right]$$

is provided by means 72 which comprise static pressure tap 74 and total pressure tap 76 in the fan duct 66, a duct head sensor 78, a differentiator 80, a gain function generator 82, and a multiplier 84. Static and total pressure signals from the pressure taps 74, 76 provide an input to the duct head sensor 78 which manipulates the input to provide an output proportional to the difference between total pressure and static pressure divided by static pressure, i.e., is proportional to fan air flow. This Mach number signal is differentiated with respect to time by differentiator 80 and fed to multiplier 84. Multiplier 84 adjusts the Mach number derivative signal by a gain factor which is a function of fan inlet temperature $T_{22}$ as indicated by Equation 10 above and explained in connection therewith.

Speed derivative signal generating means 86 comprises a tachometer device (not shown) adapted to provide an output which is proportional to fan 68 speed, a differentiator 88, a multiplier 90, and a function generator 92. The speed derivative signal is generated by operating on the speed signal from the tachometer device with differentiator 88 and feeding the time derivative into multiplier 90, which enters a gain factor which is a function of fan inlet temperature as indicated by Equation 9 above and explained in connection therewith. The two engine air flow partial derivative signals (i.e., speed derivative and duct Mach number derivative) are summed in the summing means 58 described above to provide the signal which is proportional to the rate of change of engine air flow.

The means 60 for generating the shock wave position deviation signal includes a summing device 61 which provides the difference between the pressure output signal from the pressure sensor 44 and a signal from the throat area control 42 which is the desired or appropriate pressure rise across the shock front. This difference pressure is then corrected for pressure level by the divider 61. Construction of the pressure sensor and operation of the shock wave position deviation signal means will be more readily understood by reference to FIG. 3 in conjunction with the explanation below.

Figure 3:
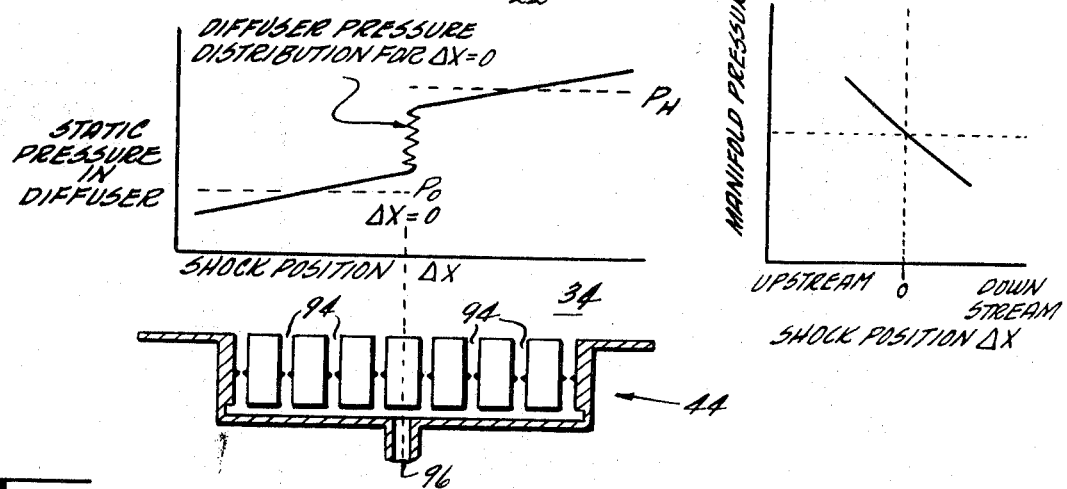
FIG. 3 is a diagrammatic view of a shock position sensor and its operation.
Figure 4:
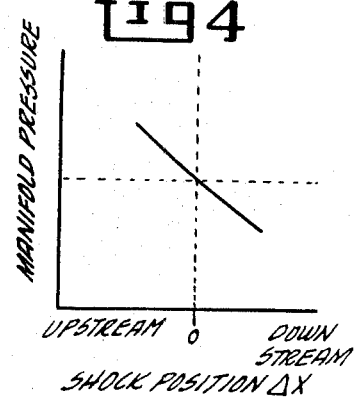
FIG. 4 is a graph showing the operating characteristic of the shock position sensor shown in FIG. 3.

The upper portion of FIG. 3 is a graph which illustrates the pressure profile in the inlet diffuser 34. That portion of the graph to the left of the discontinuity represents the region wherein air velocity is supersonic and the portion of the graph to the right of the discontinuity is the subsonic region of the inlet diffuser 34, the location of the discontinuity along the ordinate corresponding to the shock front position in the diffuser. The lower part of FIG. 3 illustrates pressure sensor 44 on the same scale as the ordinate of the pressure characteristic graph. The position on the graph and on the sensor 44 which is designated $\Delta X$ equals 0 corresponds to a position near the inlet diffuser throat, i.e., the optimum shock position for efficient pressure recovery and tolerance margin. Sensor 44 is located such that a number of pressure taps 94 appear both fore and aft of the desired shock front position. It can be shown that when the output pressure tube 96 is dead headed, the pressure therein is proportional to the deviation of the shock front from the $\Delta X$ equals 0 position as shown in FIG. 4.

Referring back to the summing means 58 shown in FIG. 1 in connection with the explanation above, it can be seen that the output of the summing means will independently reflect any one of three quantities, i.e., deviation of the shock position from its set point, an impending shift of the shock front as indicated by the shock position derivative, and impending changes in engine air flow as indicated by the signal proportional to the rate of change of air flow. Thus, this input combined with the feedback section and error and gain section described above provides a control wherein steady state shock position can be maintained as a function of the $\Delta X$ signal and which will anticipate impending disturbances to the shock location which result from either engine transients or inlet transients.

The control hardware necessary to accomplish the functions described in connection with the diagram of FIG. 1 can be chosen to operate in an electrical mode, a mechanical or hydromechanical mode, a pneumatic-fluidic mode or some combination of the three. As can be gathered from the discussions above, the hardware will include transducers for converting an engine or inlet operating condition to the mode in which the control system is designed to operate, differentiators, means for summing and for subtracting two or more signals, multipliers, and the duct head sensor (which is simply a combination of a subtracting device and a divider). Devices of the types described are available to the control system engineer in each of the three modes of control referred to. Their construction is well known to persons skilled in the control arts and more particularly to persons skilled in the specific mechanical, electrical, or pneumatic-fluidic arts, and require no further discussion here.

Figure 5:
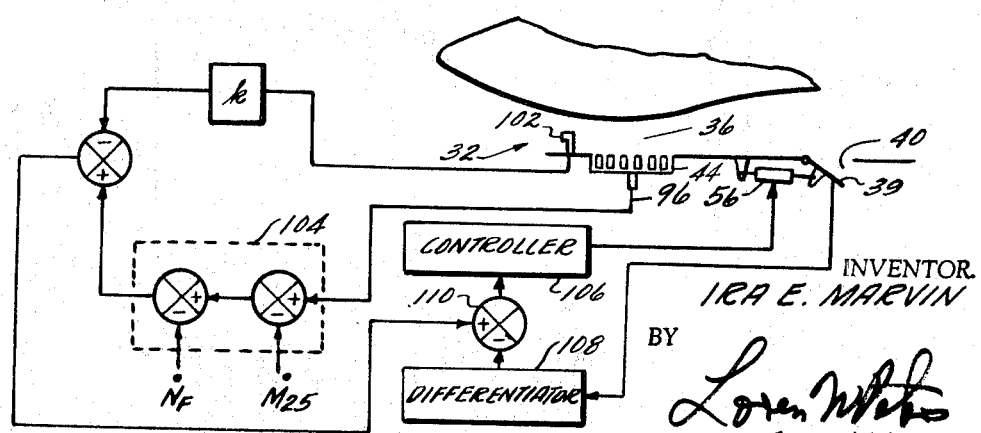
FIG. 5 is a diagrammatic view showing an alternate embodiment of the air inlet control system.

Referring now to FIG. 5, alternate means of connecting the elements described above to form an inlet bypass control loop which directly controls shock position is shown. A reference pressure signal is computed as a constant times a sensed total pressure in the throat region of diffuser 34, such as that obtained from pressure tap 102. The constant K has a value such that the generated reference pressure is representative of the pressure sensor 44 output tube 96 pressure when the shock indicated in FIG. 3 is in its desired position and depends upon the location of pressure tap 102 in diffuser 34 and the pressure distribution in the diffuser 34 (see FIG. 3).

A pressure signal from pressure sensor 44 output tube 96 is modified by bias means 104 for the transient engine air flow signals, $M_{25}$ and $\dot{N}_F$, obtained from devices 72 and 86 as described for FIG. 1. Bias means 104 is essentially a summing device such as that designated 58 in connection with FIG. 1, which adds to the shock position pressure sensor 44 output tube 96 signal the transient engine air flow signals to create a false shock position feedback signal. This modified shock position feedback signal from device 104 is compared with the reference pressure and the error signal is applied to controller 106 (which is similar to controller 54 of FIG. 1) which drives actuator 56 to position bypass doors 39. Bypass area rate feedback is obtained through differentiator 108 and used with the controller 54 loop by modifying the error signal through summer 110 to aid in dynamic stabilization of the control system.

In summary, a supersonic inlet system has been described wherein parameters directly proportional to engine air flow and the rate of change of engine air flow are used to anticipate air flow changes and their resultant effect on maintenance of the shock front at its optimum position and to initiate corrective action before the full effect of the transient is reflected at the inlet diffuser throat. Two embodiments of the inlet control system have been described. It is not, however, intended to limit the invention to the particular embodiments described, all reasonable equivalents thereof being intended to fall within the scope of the appended claims.

What is claimed is:

1. In a turbopropulsion engine supersonic inlet system having means for matching engine inlet air flow with engine air requirements to maintain inlet efficiency, the improvement which comprises,
   (A) means for varying the air flow at the engine inlet;
   (B) control means for actuating said air flow varying means to maintain the shock wave in said inlet at its optimum position; and
   (C) means proportionately responsive to a rate of change in engine air requirements for causing said control means to actuate said air flow varying means at a rate proportional to said air requirements rate of change.

2. The improvement recited in claim 1, wherein said improvement includes means responsive to a rate of change in shock position for causing said control means to actuate said air flow varying means at a rate proportional thereto.

3. The improvement recited in claim 1 wherein the means for varying air flow at the engine inlet comprises variable area bypass means upstream of the engine for diverting part of the ingested air from the inlet system.

4. The improvement recited in claim 1 wherein the combination of said control means and said engine responsive means comprises,
   (A) means for obtaining an error signal proportional to the deviation of the shock wave position from its optimum, said error signal generating means including means for obtaining a reference signal proportional to desired shock position, means for obtaining a feedback signal proportional to actual shock position, and means for summing said reference signal and said feedback signal;
   (B) a controller responsive to said error signal;
   (C) means responsive to said controller for actuating said air flow varying means; and
   (D) bias means for biasing the said error signal generating means, said bias means comprising,
      means for obtaining a signal proportional to the rate of change of engine air flow requirements, and means for summing said air flow rate of change signal with one of said feedback and said reference signals.

5. The improvement recited in claim 4 in combination with a turbojet engine wherein said means for obtaining the signal proportional to the rate of change of engine air flow requirements comprises means for obtaining a signal proportional to gas generator speed and includes means for incorporating an engine signal to generate a variable gain relating gas generator speed to engine air flow.

6. The improvement recited in claim 4 in combination with a turbofan engine wherein said means for obtaining a signal proportional to the rate of change of engine air flow requirements comprises means for obtaining a signal proportional to the rate of change of fan speed, means for obtaining a signal proportional to the rate of change of duct Mach number, and means for summing the two signals to form the said second signal, said second signal obtaining means including means for incorporating an engine signal to generate variable gains relating fan speed and duct Mach number to engine air flow.

7. The improvement recited in claim 1 wherein the combination of said control means and said engine responsive means comprises,
(A) an input section comprising,
means for obtaining a first signal proportional to the deviation of the shock wave position from its optimum,
means for obtaining a second signal proportional to the rate of change of engine air flow requirements, and
means for algebraically summing the said first and second signals to obtain a demand signal for the rate of change of said air flow varying means;
(B) a feedback section comprising means for obtaining a feedback signal proportional to the rate of change of said air flow varying means;
(C) an error generating and gain section comprising means for algebraically adding the demand signal and the feedback signal to provide a bypass area rate of change error signal; and
(D) means responsive to the said error signal for actuating said air flow varying means.

8. The improvement recited in claim 7 in combination with a turbojet engine wherein said means for obtaining said second signal comprises means for obtaining a signal proportional to the rate of change of gas generator speed and includes means incorporating an engine signal to genrate a variable gain relating gas generator speed to engine air flow.

9. The improvement recited in claim 7 in combination with a turbofan engine wherein said means for obtaining said second signal comprises means for obtaining a signal proportional to the rate of change of fan speed, means for obtaining a signal proportional to the rate of change of duct Mach number, and means for summing the two signals to form the said second signal, said second signal obtaining means including means for incorporating an engine signal to generate variable gains relating fan speed and duct Mach number to engine air flow.

10. The improvement recited in claim 7 wherein said input section includes means for obtaining a third signal representative of the rate of change of said shock position deviation and summing said third signal with said first and second signals.

References Cited
UNITED STATES PATENTS

| | | | |
|---|---|---|---|
| 2,971,328 | 2/1961 | McLafferty | 60—39.29 |
| 2,971,329 | 2/1961 | Barry | 60—39.29 X |
| 2,971,330 | 2/1961 | Clark | 60—39.29 X |
| 2,989,846 | 8/1961 | Hausammann | 137—15.2 |
| 2,997,843 | 8/1961 | Arnett et al. | 137—15.2 |
| 3,067,578 | 12/1962 | Goodall et al. | 60—39.29 X |
| 3,102,387 | 9/1963 | Caspar et al. | 60—243 |
| 3,139,922 | 7/1964 | Peczkowski | 60—39.25 X |
| 3,172,622 | 3/1965 | Kalika et al. | 60—39.29 X |
| 3,181,818 | 5/1965 | Pearl | 60—233 X |
| 3,301,269 | 1/1967 | Marwood | 60—39.28 X |

A. LAWRENCE SMITH, Primary Examiner

U.S. Cl. X.R.

60—39.29; 137—15.2